Figure 1:
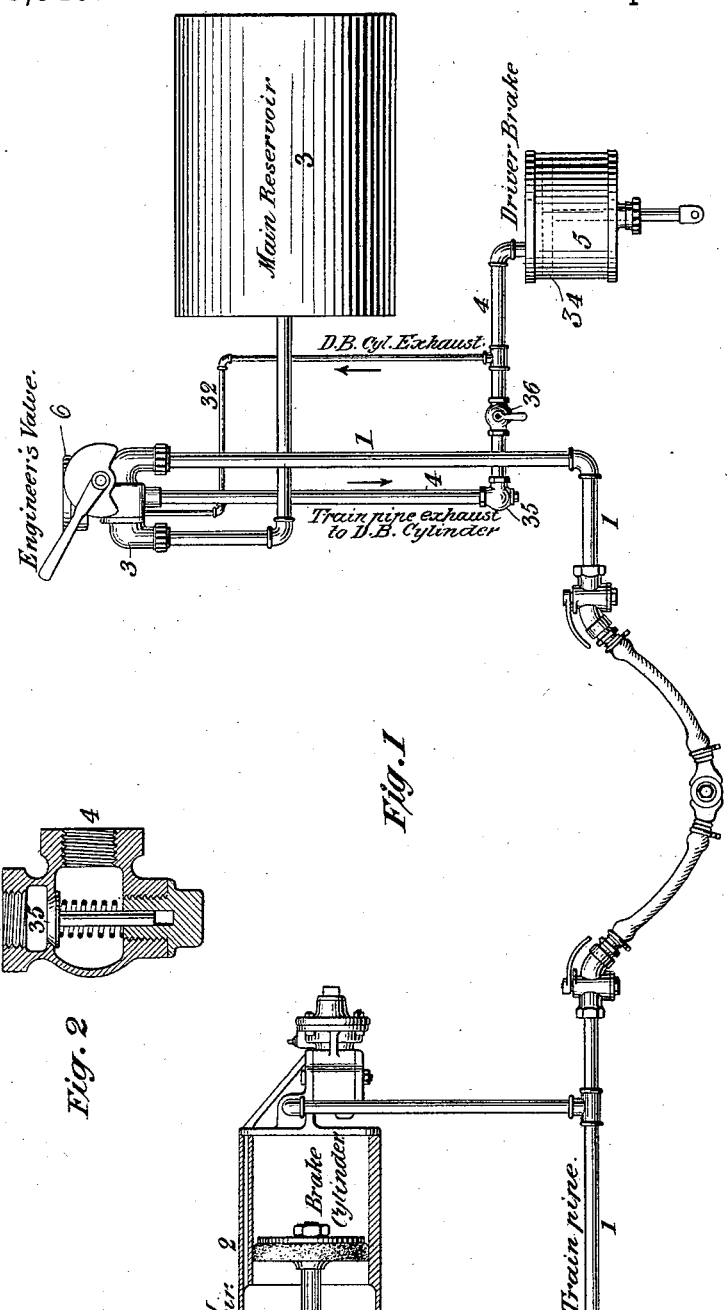

(No Model.) 5 Sheets—Sheet 1.

E. G. SHORTT.

AIR BRAKE MECHANISM AND ENGINEER'S VALVE FOR SAME.

No. 538,549. Patented Apr. 30, 1895.

Witnesses:
Raphaël Netter,
Robt. F. Gaylord.

Inventor:
Edward G. Shortt,
by Duncan & Page
Attorneys (No Model.)　　　　　　　　　　　　　　　　5 Sheets—Sheet 3.
E. G. SHORTT.
AIR BRAKE MECHANISM AND ENGINEER'S VALVE FOR SAME.
No. 538,549.　　　　　　　　Patented Apr. 30, 1895.

Witnesses:
Raphaël Netter
Robt F. Gaylord

Inventor
Edward G Shortt
by Duncan & Page
Attorneys.

(No Model.) 5 Sheets—Sheet 5.
E. G. SHORTT.
AIR BRAKE MECHANISM AND ENGINEER'S VALVE FOR SAME.
No. 538,549. Patented Apr. 30, 1895.

Witnesses:
Raphael Netter
Robt. F. Gaylord

Inventor
Edward G. Shortt
by Duncan & Page
Attorneys

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

AIR-BRAKE MECHANISM AND ENGINEER'S VALVE FOR SAME.

SPECIFICATION forming part of Letters Patent No. 538,549, dated April 30, 1895.

Application filed November 20, 1894. Serial No. 529,369. (No model.)

*To all whom it may concern:*

Be it known that I, EDWARD G. SHORTT, of Carthage, in the county of Jefferson and State of New York, have invented certain new and useful Improvements in Air-Brake Mechanism and Engineer's Valve for Same, of which the following is a specification, reference being had to the accompanying drawings, forming a part thereof.

The present improvements relate generally to automatic fluid-brake mechanism, in which the train brakes are applied by a reduction of air pressure in the train pipe.

One object of the present improvements, is to provide means whereby the air exhausted or vented under pressure from the mechanism of an air brake system, and for the purpose of effecting an application action of a brake piston thereof, can be utilized to effect an application action of a supplemental brake mechanism.

By "brake system" is meant a fluid brake mechanism, such for example as is known to this art and which consists of a train pipe and connected brake cylinder having a brake piston moved to effect a brake application by venting or exhausting from a part of the system air normally held therein under pressure. Braking action is effected, in one form of such system, by exhausting the brake cylinder and train pipe air through the medium of the train pipe. In another form, brake application is effected by separately exhausting the cylinder and train pipe air; in another, by exhausting only the train pipe air; in another, by exhausting only air that usually is stored in condition opposing train pipe air pressure; and there are other but less prominent special forms of such system.

The mechanisms I have selected to exemplify my invention, consist of the train pipe of an air brake system, which pipe represents a part of the system normally holding compressed air the exhaust of which effects the application action of the brakes of the system; of a supplemental brake cylinder and piston which may be considered as the driver-brake mechanism of a locomotive; and of a valve mechanism (in the form for example of an engineer's valve mechanism) adapted to effect the application of the brakes of the system by exhausting (as from or through the train pipe) the air held therein under pressure and to apply the same upon and for effecting an application action of the piston of the supplemental brake mechanism.

The invention consists of devices for carrying out the above mentioned objects, together with other features of improvement, the elements, and the combination of elements of which, will be pointed out in the claims to follow this specification.

Figure 2:
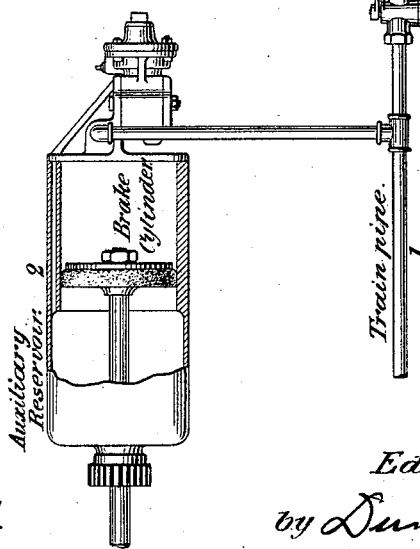
Figure 3:
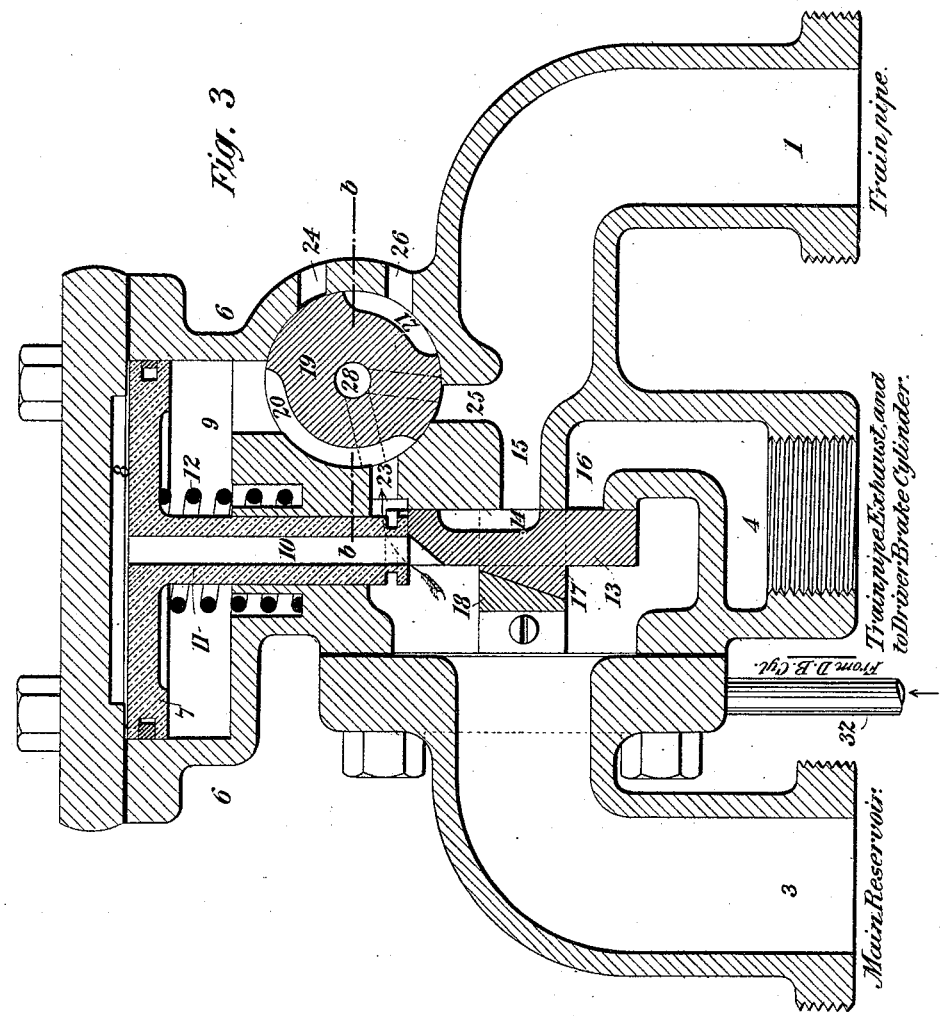
Figure 4:
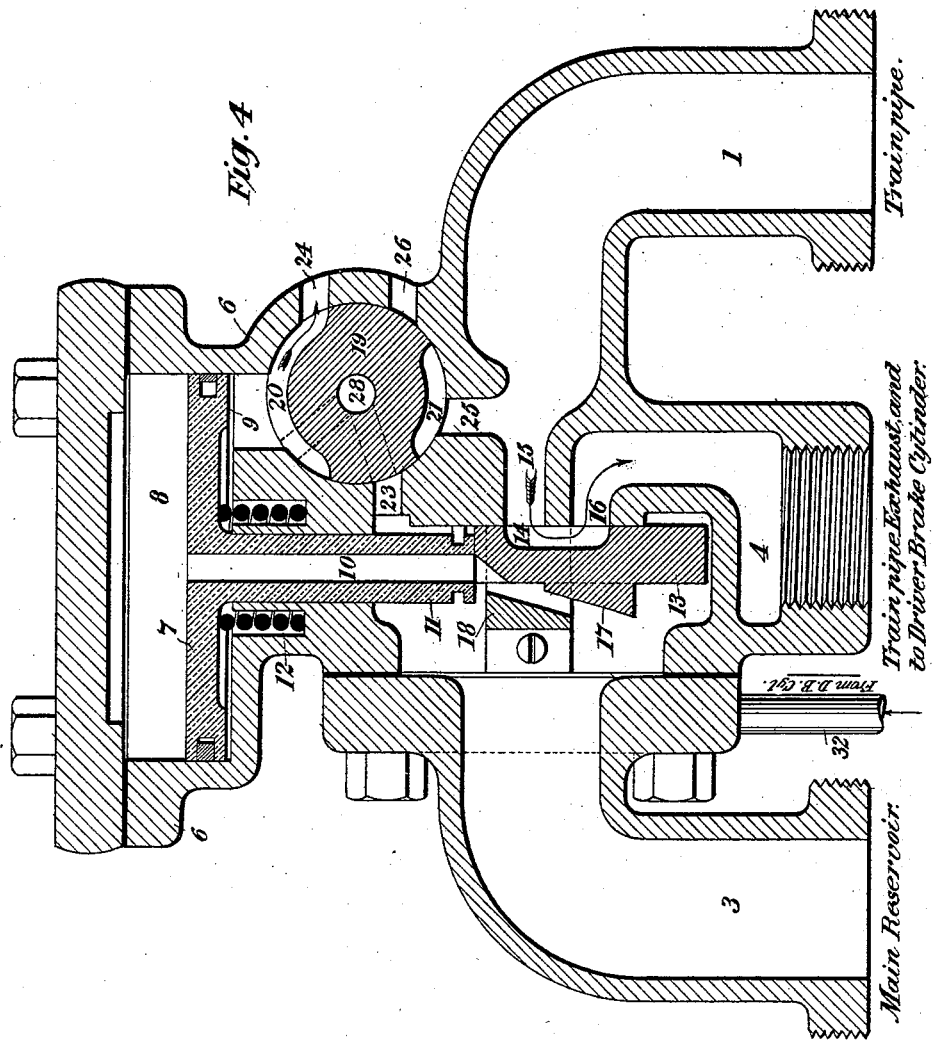
Figure 5:
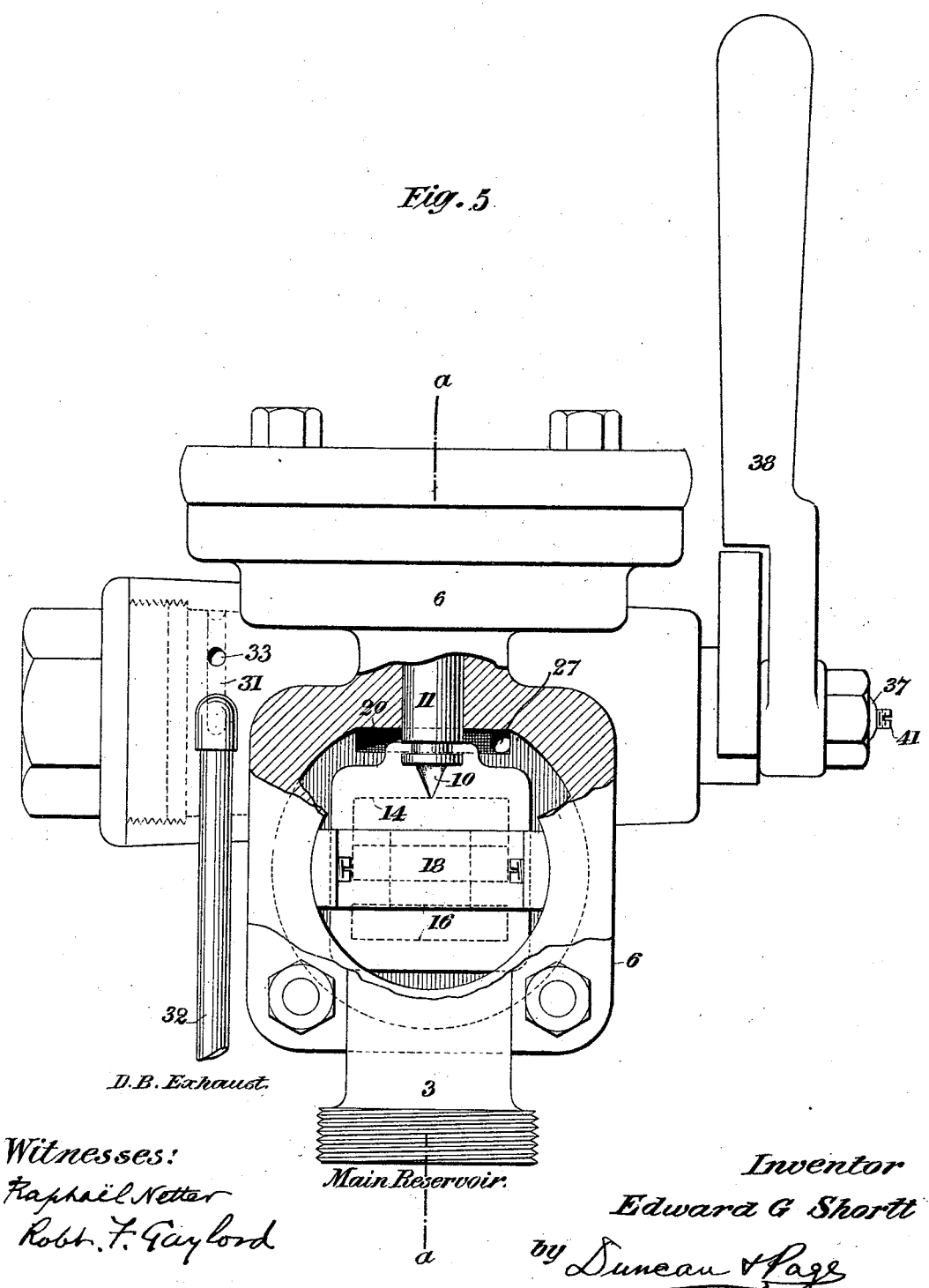
Figure 6:
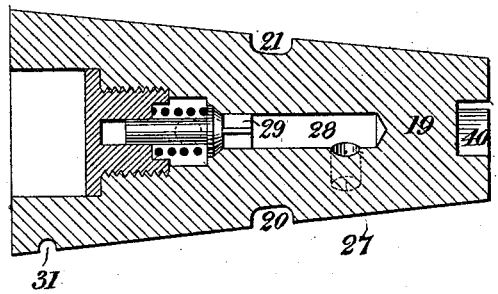
Figure 7:
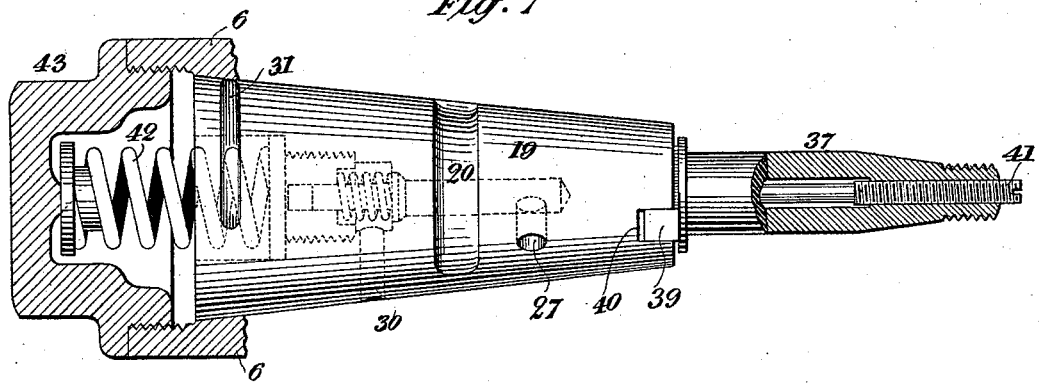
Figure 8:
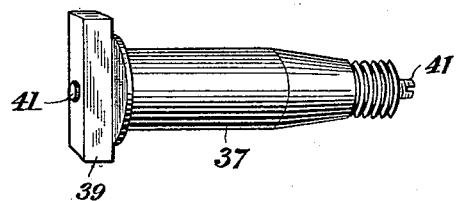

Referring to the drawings herein, Figure 1 represents a general diagrammatic view of an automatic air-brake mechanism embodying my improvements. Fig. 2 is a section of a check or retaining valve employed. Fig. 3 is a cross-section of the engineer's valve mechanism on the plane *a a* of Fig. 5, looking from the right hand or across the axis of the plug-valve to which the engineer's handle is attached, the position of the parts being that of running. Fig. 4 is a similar section with the movable parts in emergency position. Fig. 5 is an elevation view from the left hand of Figs. 3 and 4. Fig. 6 is a horizontal plan section of said hand-valve on plane *b b* of Fig. 3. Fig. 7 is an elevation view of said valve as the same is seen from the left of Fig. 3. Fig. 8 is a detail view of the hand-spindle of said valve.

Referring to these views in detail, the numeral 1 represents the train pipe; 2, one of the train-pipe brake cylinders and auxiliary or local reservoirs of the system, the form thereof herein shown being of the equilibrio construction; 3, the main reservoir and its pipe connection with the engineer's valve; 4, the exhaust pipe from the emergency exhaust port of the engineer's valve; and 5 the driver brake or supplemental cylinder.

6 indicates the casing of the engineer's valve mechanism, in which is located the piston 7 between chambers 8 and 9, the former of which may be at all times in communication with the main reservoir through a passage extending thereto, as the passage 10 through the stem 11 of said piston, and the latter of which chambers is controllably connected with the main reservoir as also with an exhaust port as explained below. A spring 12 is arranged between the casing and the piston. The stem of the piston is in operative contact at its lower end with the slide valve 13, in the face of which is cut a passage 14 of size and extent adapting the valve upon proper downward movement to put the train pipe exhaust passage 15 into full, open communication through passage 16 with exhaust pipe 4. This valve bears on its back or reservoir side the wedge 17 which at the upper position of the valve, as shown in Fig. 3, bears against the beveled bridge 18 fixed to the casing, whereby the valve is held tightly on its seat. The outer vertical edges of this valve move under shoulders in the side supports of said bridge, so that when the valve is depressed to the position shown in Fig. 4 it will still be held upon its seat. Reservoir pressure also acts to hold the valve seated. The main purpose of spring 12 is to hold the valve in closed position, its arrangement and tension being such that when it is not restrained by the piston it will act to raise the valve against friction and reservoir pressure.

The main or hand-operated valve 19 of this mechanism is conical in shape, as seen in Figs. 6 and 7, and is provided with the emergency and release passage 20 and with the graduation passage 21, the former of which in running position of the valve, as seen in Fig. 3, acts to put the chamber 9 into communication with the main reservoir through the port 23, as also, under proper movement of the valve, to put the chamber 9 into communication with the emergency exhaust port 24, as well as the reservoir port 23 and train pipe port 25, for the purpose of release; and the latter of which passages serves to put the train pipe to graduate exhaust through the train pipe port 25 and the graduate port 26 opening to the atmosphere. This main valve is also provided with a feed passage 27 located so that when the valve is in running position, as seen in Fig. 3, it will communicate with the reservoir through passage 23. This feed passage opens into axial passage 28 which contains a spring seated pressure-retaining valve 29, and beyond said valve the passage 28 opens into the radial passage 30, which latter passage in running position is located so as to be in communication with the train pipe port 25. This valve 29 is for the purpose of retaining a certain excess pressure in the main reservoir over and above the pressure of the train pipe, for purposes well understood in the art. The main valve is also provided with a peripheral passage 31, the lower end of which, see Fig. 5, is, in position of running, in open communication with the pipe 32 as also with the driver brake exhaust port 33. Pipe 32 openly joins the exhaust pipe 4, which latter pipe extends to and enters the driver brake cylinder above or below the piston 34 therein according to the direction the piston is to move to apply the brakes.

Located in pipe 4, is the retaining valve 35, the function of which is to permit a flow of air along the pipe 4 into the driver brake cylinder and to prevent the back flow of the same.

36 is a three-way cock of common construction, the office of which is, when turned in one position, to open the pipe 4 as between the engineer's valve and the driver brake cylinder and close the same against the atmosphere, and, in another position, to open said pipe to the atmosphere and close the same as to communication with the driver brake cylinder.

37 is the stem of the main valve, to which stem is fixed the engineer's handle 38. This stem engages the inner end of the valve by the driver head 39 fixed to the spindle and lying in the radial groove 40.

41 is a rod which is threaded in the spindle and bears against the smaller end of the plug valve.

42 is a spring arranged between the larger end of the plug and the cap 43 which engages a threaded hub on casing 6, which spring is to keep the valve seated in its casing. A spring so arranged acts to gradually seat the valve tighter than is desired and to make its operation too hard, and by the use of the screw rod 41 the plug can be set to seat by just the desired frictional contact, as well as adjusted to compensate for wear.

The screw rod is a positive and yet adjustable stop acting to control the seating power of the spring. It is to be noted that the screw stop-rod rotates with the valve, being carried by the stem, and hence there is no motion relatively of the rod and valve, and no wear between the same to affect the adjustment.

The operation of this mechanism will now be understood.

In running position shown in Fig. 3, spring pressure, and reservoir air on the under side of the emergency valve piston serve to hold the latter and the emergency valve in upper position. Reservoir air acts upon the pressure retaining-valve and escapes at a reduced pressure into the train pipe; also the reservoir air serves to hold the emergency valve closely pressed to its seat. When it is desired to effect a graduation stop, the operating handle of the main valve is turned to the right so as to bring the graduation passage into communication with the train pipe port 25 and the graduation port 26, whereupon the desired reduction of the train pipe pressure will be effected; after which the valve will be returned to running position or to release position, depending upon the demands of operation.

To effect an emergency application of the brakes, the valve handle will be turned to the extreme right, the reservoir passage 23 will be closed and the emergency passage 20 will put the chamber 9 to the atmosphere through the emergency port 24, which will result in immediately discharging the reservoir pressure under the slide valve piston, whereupon the reservoir pressure above the same will be exerted to overcome spring 12 and to force the said piston and the slide valve downwardly, or into the emergency position shown in Fig. 4, in which position the valve will be held, by the then substantially uniform reservoir pressure, until the handle is reversed. The air vacated from the train pipe will flow into the driver brake cylinder and move the piston to make an application of the brakes on the locomotive, the retaining valve in pipe 4 preventing the backward rush of the air from this cylinder.

When it is desired to release the brakes, the engineer's valve handle is turned to the extreme left, and the main valve in rotating will first close the emergency port, then the chamber 9 will be put to communication with the main reservoir through the emergency and release passage and the slide valve raised to its uppermost position thereby closing the train pipe emergengy exhaust port; and the further rotation of the main valve will next put the train pipe and main reservoir into communication through said passage, whereupon said pipe will be recharged and the train brakes be released. After this release action, the valve may be turned to running position. At the same time that the valve is rotated to the left and as it reaches running position, the passage 31 in the larger end of this valve will come into communication with the driver brake exhaust pipe 32 and the exhaust port 33, and thereupon the driver brake cylinder air will escape to atmosphere and the driver brakes will be released. This exhaust passage is of such extent that, during the movement of the valve between release and graduation positions, the pipe 32 is held to open communication with its exhaust port. Onlap position will obviously be that position between the running and graduation positions where all ports are blanked, except as to communication between the reservoir and chamber 9. When it is desired, the driver brakes may be cut out by the three-way cock, and also they may be applied or released thereby.

The essential advantages of this mechanism, are that the exhaust pressure from the train pipe is availed of for the purpose of applying the driver or other supplemental brakes; also, that the work of raising the emergency valve against reservoir pressure is not put on the engineer, who by simply turning his main valve, which has no essential pressure thereon and therefore turns easily, can so direct the reservoir air that its pressure is utilized to open the emergency valve, and this however imperfectly the emergency port is opened, so long as it is opened at all; and, further, reservoir pressure is availed of for very promptly and certainly closing the emergency valve and before release communication is effected with the train pipe.

Other advantages will occur to those skilled in the art and which, therefore, are not necessary to be mentioned here.

What is claimed as new is—

1. In combination, with an air brake system mechanism in which the brakes thereof are applied by exhausting from the system, air normally held therein under pressure, a supplemental brake cylinder and brake-actuating piston, an exhaust passage connection from said mechanism to said cylinder, and a valve controlling said connection and operable to conduct the air exhausted from said mechanism to said cylinder to effect a braking action of its piston.

2. In combination, with an air brake system mechanism in which the brakes thereof are applied by exhausting from the system, air normally held under pressure therein, a supplemental brake cylinder and brake-actuating piston, an exhaust passage connection from said mechanism to said cylinder, a valve controlling said connection and operable to conduct the air exhausted from said mechanism to said cylinder to effect a braking action of its piston, and an exhaust passage connection from said cylinder to and controlled by said valve.

3. In combination with an air-brake mechanism and with the train pipe and a brake cylinder and piston thereof, a supplemental brake cylinder and piston, an exhaust passage connection from the train pipe to said supplemental cylinder, and a valve controlling said connection and operable to conduct the air exhausted from the train pipe to the supplemental cylinder to effect a brake application action of its piston.

4. In combination with an air brake train pipe, a brake-cylinder auxiliary-reservoir and valve mechanism acted upon by train pipe pressure to control the same, a supplemental brake piston and cylinder, and a valved passage connection from the train pipe to the supplemental cylinder acting to conduct the train pipe exhaust air to said supplemental cylinder whereby to actuate its brake piston.

5. In combination in an air brake mechanism and with the train pipe and engineer's valve thereof, a brake piston and cylinder, and a passage connection from the train pipe exhaust port of the engineer's valve to said cylinder, whereby train pipe exhaust air is conveyed to said cylinder and to actuate its brake piston.

6. In combination in an air brake mechanism and with the train pipe and engineer's valve thereof, a brake piston and cylinder, a passage connection from the train pipe exhaust port of the engineer's valve to said cylinder, whereby train pipe exhaust air is conveyed to said cylinder and to actuate its brake piston, and a retaining valve located in said connection and acting to prevent flow of air from the cylinder to the train pipe.

7. In combination in an air brake mechanism and with the train pipe and engineer's valve of the same, a brake piston and cylinder having a passage connection to the train pipe exhaust port of said valve, and the said valve having ports and passages acting upon suitable movement of the valve to convey the train pipe exhaust air to said cylinder and to exhaust the same therefrom.

8. In combination in an engineer's valve mechanism, a valve controlling an exhaust port from the train pipe, a piston connected thereto and having a substantially uniform air pressure on one of its faces and normally maintained opposing air pressure on its opposite face, and a hand valve acting upon suitable movement to exhaust the normally maintained air to operate said piston to open said valve.

9. In combination in an engineer's valve mechanism, a valve controlling the emergency exhaust port from the train pipe and normally held closed by a spring, a piston movable by a variation of pressure on its opposite faces to open said valve, and a hand-operated valve acting upon suitable movement to effect said variation of pressure, substantially as set forth.

10. In combination in an engineer's valve mechanism, a valve controlling the emergency exhaust port from the train pipe and normally held closed by a spring, a piston for opening said valve, an open passage conveying reservoir air to one side of said piston, and a controllable passage for conveying reservoir air to and exhausting it from the other side of said piston for the purpose of opening said emergency valve, substantially as set forth.

11. In combination in an engineer's valve mechanism, a valve controlling the emergency exhaust port from the train pipe, a piston for operating said valve and arranged in a chamber openly communicating with the main reservoir on one side of the piston, a passage extending from the reservoir to the said chamber on the other side of said piston, and a valve located in said passage and operable to effect a variation of reservoir pressure on the piston, for the purpose of opening and closing said emergency valve, substantially as set forth.

12. In combination in an engineer's valve mechanism, a slide valve controlling the emergency exhaust port from the train pipe, a piston attached to and for operating said valve and arranged in a chamber openly communicating with the main reservoir on one side of said piston, a passage extending from the reservoir to the said chamber on the other side of said piston, and a valve located in said passage and for effecting a variation of reservoir pressure on the piston to operate said emergency valve and also to put the train pipe to graduate exhaust, substantially as set forth.

13. In combination in an engineer's air brake valve mechanism, a casing and a conical or plug valve seated therein, a spring for holding said valve to seat, and a stop bearing against and moving with said valve and adjustable to control the valve seating action of said spring, for the purpose set forth.

14. In combination in an engineer's airbrake valve mechanism, a casing and a conical valve seated therein, a spring for holding said valve seated, a stem engaging and for rotating said valve, and a stop carried by said stem and adjustable to limit the valve seating action of said spring, for the purpose set forth.

EDWARD G. SHORTT. [L. S.]

Witnesses:
JOHN UNSER,
H. B. EDMONDS.